United States Patent
Hutter et al.

(10) Patent No.: US 10,712,385 B2
(45) Date of Patent: Jul. 14, 2020

(54) FREEZE LOGIC

(71) Applicant: CRYPTOGRAPHY RESEARCH, INC., Sunnyvale, CA (US)

(72) Inventors: Michael Hutter, Walnut Creek, CA (US); Matthew Pond Baker, San Francisco, CA (US)

(73) Assignee: CRYPTOGRAPHY RESEARCH INC., Sunnyvale, CA (US)

( * ) Notice: Subject to any disclaimer, the term of this patent is extended or adjusted under 35 U.S.C. 154(b) by 0 days.

(21) Appl. No.: 15/780,009

(22) PCT Filed: Dec. 1, 2016

(86) PCT No.: PCT/US2016/064450
§ 371 (c)(1),
(2) Date: May 30, 2018

(87) PCT Pub. No.: WO2017/096059
PCT Pub. Date: Jun. 8, 2017

(65) Prior Publication Data
US 2018/0356464 A1 Dec. 13, 2018

Related U.S. Application Data

(60) Provisional application No. 62/262,255, filed on Dec. 2, 2015.

(51) Int. Cl.
*G01R 31/317* (2006.01)
*G06F 21/75* (2013.01)
(Continued)

(52) U.S. Cl.
CPC ... *G01R 31/31703* (2013.01); *G01R 31/3177* (2013.01); *G01R 31/31721* (2013.01);
(Continued)

(58) Field of Classification Search
CPC .......... G06F 21/55; G06F 21/755; G06F 7/00; G06F 21/72; G06F 21/75;
(Continued)

(56) References Cited

U.S. PATENT DOCUMENTS

| 6,510,518 B1 | 1/2003 | Jaffe et al. |
| 6,526,542 B2 | 2/2003 | Kondratyev |

(Continued)

FOREIGN PATENT DOCUMENTS

WO WO-2005-081085 A2 9/2005

OTHER PUBLICATIONS

EP Extended European Search Report dated May 27, 2019 re: EP Appln. No. 16871511.8. 9 Pages.

(Continued)

*Primary Examiner* — Shelly A Chase
(74) *Attorney, Agent, or Firm* — Lowenstein Sandler LLP

(57) ABSTRACT

A first plurality of logic gates and a second plurality of logic gates may be associated with a symmetric configuration. A first output at a first value may be generated by the first plurality of logic gates based on a first portion of input signals. A second output may be generated by the second plurality of logic gates at the first value based on a second portion of the input signals. A subsequent first output at a particular value may be generated by the first plurality of logic gates based on a first portion of a second plurality of input signals and a subsequent second output maybe generated by the second plurality of logic gates based on a second portion of the second plurality of input signals. A value of the subsequent second output may be complementary to the particular value of the subsequent first output.

17 Claims, 10 Drawing Sheets

(51) Int. Cl.
| | |
|---|---|
| H04L 9/00 | (2006.01) |
| G09C 1/00 | (2006.01) |
| G06F 21/72 | (2013.01) |
| G01R 31/3177 | (2006.01) |
| G06F 21/55 | (2013.01) |

(52) U.S. Cl.
CPC .............. *G06F 21/55* (2013.01); *G06F 21/72* (2013.01); *G06F 21/755* (2017.08); *G09C 1/00* (2013.01); *H04L 9/003* (2013.01)

(58) Field of Classification Search
CPC ...... G01R 31/318566; G01R 31/31703; G01R 31/31721; G01R 31/3177
See application file for complete search history.

(56) References Cited

U.S. PATENT DOCUMENTS

| | | | |
|---|---|---|---|
| 7,249,339 B1 | 7/2007 | Pedersen | |
| 7,586,334 B2 | 9/2009 | Manfred | |
| 7,863,926 B2* | 1/2011 | Duflot | G06F 21/755 326/8 |
| 7,881,465 B2 | 2/2011 | Degrendel et al. | |
| 8,395,408 B2* | 3/2013 | Tanimura | H03K 19/00392 326/10 |
| 8,904,192 B2* | 12/2014 | Danger | G06F 7/00 713/193 |
| 2011/0085662 A1 | 4/2011 | Myers et al. | |
| 2011/0167279 A1 | 7/2011 | Danger et al. | |
| 2011/0225560 A1 | 9/2011 | Verbauwhede et al. | |
| 2011/0260749 A1 | 10/2011 | Deas et al. | |
| 2013/0120024 A1* | 5/2013 | Verbauwhede | G06F 7/00 326/93 |
| 2016/0112194 A1* | 4/2016 | Choi | H04L 9/003 380/28 |

OTHER PUBLICATIONS

Benini, Luca et al., "Glitch Power Minimization by Selective Gate Freezing", IEEE Transactions on Very Large Scale Integration (VLSI) Systems, vol. 8, No. 3, Jun. 2000, pp. 287-298. 12 pages.

Bhasin, Shivam et al., "Countering Early Evaluation: An Approach Towards Robust Dual-Rail Precharge Logic", Proceedings of the 5th Workshop on Embedded Systems Security (WESS'10), Oct. 24, 2010, Scottsdale, AZ. 8 pages.

Bilgin, Begul et al., "A More Efficient AES Threshold Implementation", Cryptology ePrint Archive, Report 2013/697. 17 pages.

Canright, D. et al., "A Very Compact "Perfectly Masked" S-Box for AES (corrected)", Cryptology ePrint Archive, Report 2009/011, 2009. 16 pages.

Canright, D., "A Very Compact S-box for AES", Cryptographic Hardware and Embedded Systems—(CHES 2005), Proceedings of the 7th International Workshop, Edinburgh, UK, Aug. 29-Sep. 1, 2005, pp. 441-455. 15 pages.

Chen, Zhimin et al., "Dual-Rail Random Switching Logic: A Countermeasure to Reduce Side Channel Leakage", Proceedings of the 8th International Workshop, Cryptographic Hardware and Embedded Systems (CHES 2006), Oct. 10-13, 2006, pp. 242-254. 13 pages.

Leiserson, Andrew J. et al., "Gate-Level Masking Under a Path-Based Leakage Metric", Cryptographic Hardware and Embedded Systems (CHES 2014), Proceedings of the 16th International Workshop, Sep. 23-26, 2014, pp. 580-597. 18 pages.

Moradi, Amir et al., "Early Propagation and Imbalanced Routing, How to Diminish in FPGAs", Cryptographic Hardware and Embedded Systems (CHES 2014), Proceedings of the 16th International Workshop, Sep. 23-26, 2014, pp. 598-615. 18 pages.

Moradi, Amir et al., "Pushing the Limits: A Very Compact and a Threshold Implementation of AES", Proceedings of the 30th Annual International Conference on the Theory and Applications of Cryptographic Techniques (EUROCRYPT 2011), May 15-19, 2011, pp. 69-88. 20 pages.

Nassar, Maxime et al., "BCDL: A High Speed Balanced DPL for FPGA with Global Precharge and no Early Evaluation", Design, Automation & Test i Europe Conference & Exhibition (DATE),. 2010, pp. 849-854, Mar. 8-12, 2010. 6 pages.

Notification Concerning Transmittal of International Preliminary Report on Patentability dated Jun. 14, 2018 re: Int'l Appln. No. PCT/US2016/064450. 9 Pages.

Notification of Transmittal of the International Search Report and the Written Opinion of the International Searching Authority, or the Declaration dated Feb. 1, 2017 re: Int'l Appln. No. PCT/US16/064450. 14 Pages.

Popp, Thomas et al., "Masked Dual-Rail Pre-charge Logic: DPA-Resistance Without Routing Constraints", Cryptographic Hardware and Embedded Systems (CHES 2005), Proceedings of the 7th International Workshop, Aug. 29-Sep. 1, 2005, pp. 172-186. 15 pages.

Suzuki, Daisuki et al., "Random Switching Logic: A Countermeasure against DPA based on Transition Probability", Cryptology ePrint Archive, Report 2004/346, 2004. 16 pages.

Tiri, Kris et al., "A Dynamic and Differential CMOS Logic with Signal independent Power Consumption to Withstand Differential Power Analysis on Smart Cards", Proceedings of the 28th European Solid-State Circuits Conference (ESSCIRC 2002), Sep. 24-26, 2002, pp. 403-406. 4 pages.

Tiri, Kris et al., "A Logic Level Design Methodology for a Secure DPA Resistant ASIC or FPGA Implementation", Proceedings of the Design, Automation and Test in Europe Conference and Exhibition, 2004. vol. 1, pp. 246-251, Feb. 16-20, 2004. 6 pages.

Wild, Alexander et al., "Evaluating the Duplication of Dual-Rail Precharge Logics on FPGAs", Constructive Side-Channel Analysis and Secure Design (COSADE 2015), vol. 9064 of Lecture Notes in Computer Science, Springer, 2015. 15 pages.

Wild, Alexander et al., "GliFreD: Glitch-Free Duplication Towards Power-Equalized Circuits on FPGAs", Cryptology ePrint Archive, Report 2015/124, 2015. 8 pages.

EP Communication Pursuant to Article 94(3) EPC dated Jan. 23, 2020 re: EP Appln. No. 16871511.8. 6 Pages.

* cited by examiner

FIG. 5B

| a | | | | | | | b | | | | | | | c | | | | | | | d | | | | | | | e | | | | | | | f | | | | | | |
|---|---|---|---|---|---|---|---|---|---|---|---|---|---|---|---|---|---|---|---|---|---|---|---|---|---|---|---|---|---|---|---|---|---|---|---|---|---|---|---|---|---|
| 0 | 0 | 0 | 0 | 0 | 0 | 0 | 0 | 0 | 0 | 0 | 1 | 1 | 1 | 0 | 1 | 1 | 0 | 0 | 1 | 1 | 0 | 1 | 0 | 1 | 0 | 1 | 1 | 0 | 0 | 0 | 0 | 0 | 1 | 0 | 1 | 0 | 0 | 0 | 0 | 0 | 1 |

FREEZE LOGIC

CROSS-REFERENCE TO RELATED APPLICATIONS

This application is a National Phase entry of PCT/US2016/064450, filed Dec. 1, 2016, which claims the benefit of priority to U.S. patent application Ser. No. 62/262,255, filed Dec. 2, 2015, the contents of each being hereby incorporated by reference herein in their entireties.

BRIEF DESCRIPTION OF THE DRAWINGS

The present disclosure will be understood more fully from the detailed description given below and from the accompanying drawings of various implementations of the disclosure.

FIG. 5B illustrates a truth table corresponding to the operation of an example implementation of freeze logic based on the XOR gate functionality in accordance with some embodiments.

DETAILED DESCRIPTION

Figure 1:
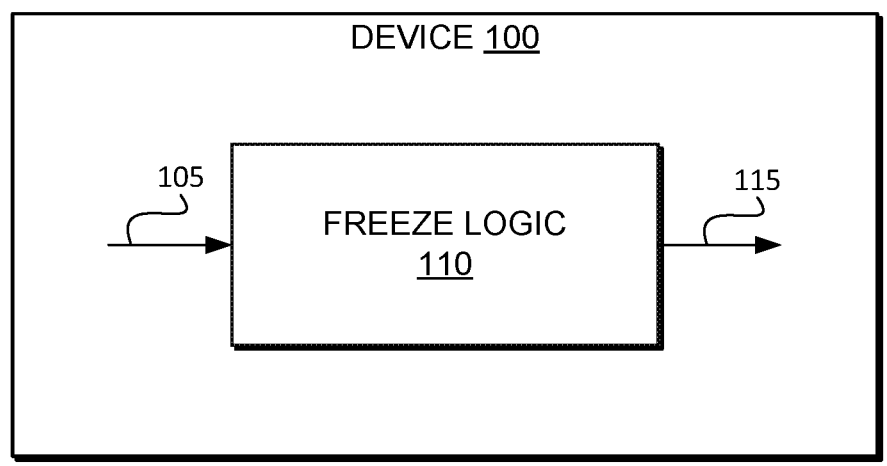
FIG. 1 illustrates an example device with freeze logic in accordance with some embodiments.

Aspects of the present disclosure are directed to freeze logic of a device. The operations of a device may result in the device being susceptible to a side channel attack. An example of a side channel attack includes, but is not limited to, Differential Power Analysis (DPA) where an attacker who seeks to obtain information from the device may study the power consumption of the circuitry of the device or an electromagnetic (EM) analysis where the attacker may obtain information from the device by studying the electromagnetic radiation from the device. For example, the circuitry may include a cryptographic hardware circuit that may be used to generate a cryptographic key or other secret information. The attacker may be an unauthorized entity who may obtain the cryptographic key or other secret information from the cryptographic hardware circuit by analyzing the power consumption measurements of the cryptographic hardware circuit over a period of time as the operations to generate the cryptographic key or other secret information are performed.

A power glitch of the circuitry of the device may contribute towards the susceptibility of the circuitry of the device to a DPA attack. A glitch may refer to a spurious transition in the combinatorial logic of the circuitry of the device. For example, a component or logical gate of the combinatorial logic may output an undesired transition before the output signal settles at an intended value. If the component or logical gate of the combinatorial logic is intended to receive two input signals and to provide an output signal based on the two input signals, the output signal may be considered to be a glitch when the component or logical gate provides an output after receiving one of the two input signals but has not yet received the other of the two input signals.

Freeze logic may be used in the circuitry of the device to prevent glitches so that the circuitry is less susceptible to a DPA attack. For example, freeze logic may be used so that a component or logical gate of the combinatorial logic of the circuitry may not provide an output until all inputs of the component or logical gate have been received. Thus, a spurious transition may not be outputted by the component or logical gate since no output may be provided until each input signal has been received.

Furthermore, the freeze logic may correspond to a dual rail freeze logic that may include differential logic. For example, the dual rail freeze logic may include a first freeze logic portion that may be referred to as a "true network" and a second freeze logic portion that may be referred to as a "false network." The inputs to the true network may be complementary to the inputs of the false network. The dual rails, or inclusion of logic with complementary inputs, may further reduce the susceptibility of the circuitry to a DPA attack by equalizing power consumption of the circuitry.

Freeze logic may be implemented using symmetric and balanced logic cells. For example, the same cell type can be used to generate the true and the false output signals. The symmetric and balanced inputs to the logic cells may reduce side-channel leakage that is caused by different signal arrival times. Freeze logic thus reduces the effect of early-evaluation of logic gates.

In some embodiments, pre-charge and evaluation phases may be used with the dual rail freeze logic. For example, a pre-charge phase may provide inputs to freeze logic so that the output of the freeze logic, or the output of each of the freeze logic of the dual rail freeze logic, may be at a value of zero or a one (e.g., all outputs are either a zero or a one). After the pre-charge phase, an evaluation phase may begin with the receiving of input signals to the freeze logic.

As such, aspects of the present disclosure provide greater security to a device by reducing the susceptibility of circuitry of the device to a DPA attack. For example, the use of dual rail freeze logic with pre-charge and evaluation phases may reduce the output of glitches from components or logical gates of the circuitry. Thus, the generation or usage of a cryptographic key or other such secret information by the circuitry may be more safe or secure from an unauthorized entity using a DPA attack to attempt to retrieve the cryptographic key or secret information.

FIG. 1 illustrates an example device 100 with freeze logic 110. In general, the device 100 may include the freeze logic 110 that performs operations associated with the generation of cryptographic data (e.g., a cryptographic key).

As shown in FIG. 1, the device 100 may include freeze logic 110 that receives input signals 105 and provides one or more output signals 115. The freeze logic 110 may perform operations to generate cryptographic data. For example, the freeze logic 110 may include dual rail freeze logic where the freeze logic does not provide the one or more output signals 115 until all input signals 105 are received by the freeze logic 110. Further details with regard to the freeze logic are described in conjunction with FIGS. 2-7.

Furthermore, the input signals 105 may correspond to a pre-charge phase and an evaluation phase for the freeze logic 110. For example, a pre-charge phase may be received by the freeze logic 110 via the input signals 105 so that components or logical gates of the freeze logic 110 provide an output of a logical zero or a logical one. After the pre-charge phase, the freeze logic 110 may receive evaluation data (e.g., data used in the generation of cryptographic data) via the input signals 105. The freeze logic 110 may provide one or more outputs 115 based on the input signals 105 after each input signal of the evaluation data has been received by the components or logical gates of the freeze logic 110.

Figure 2:
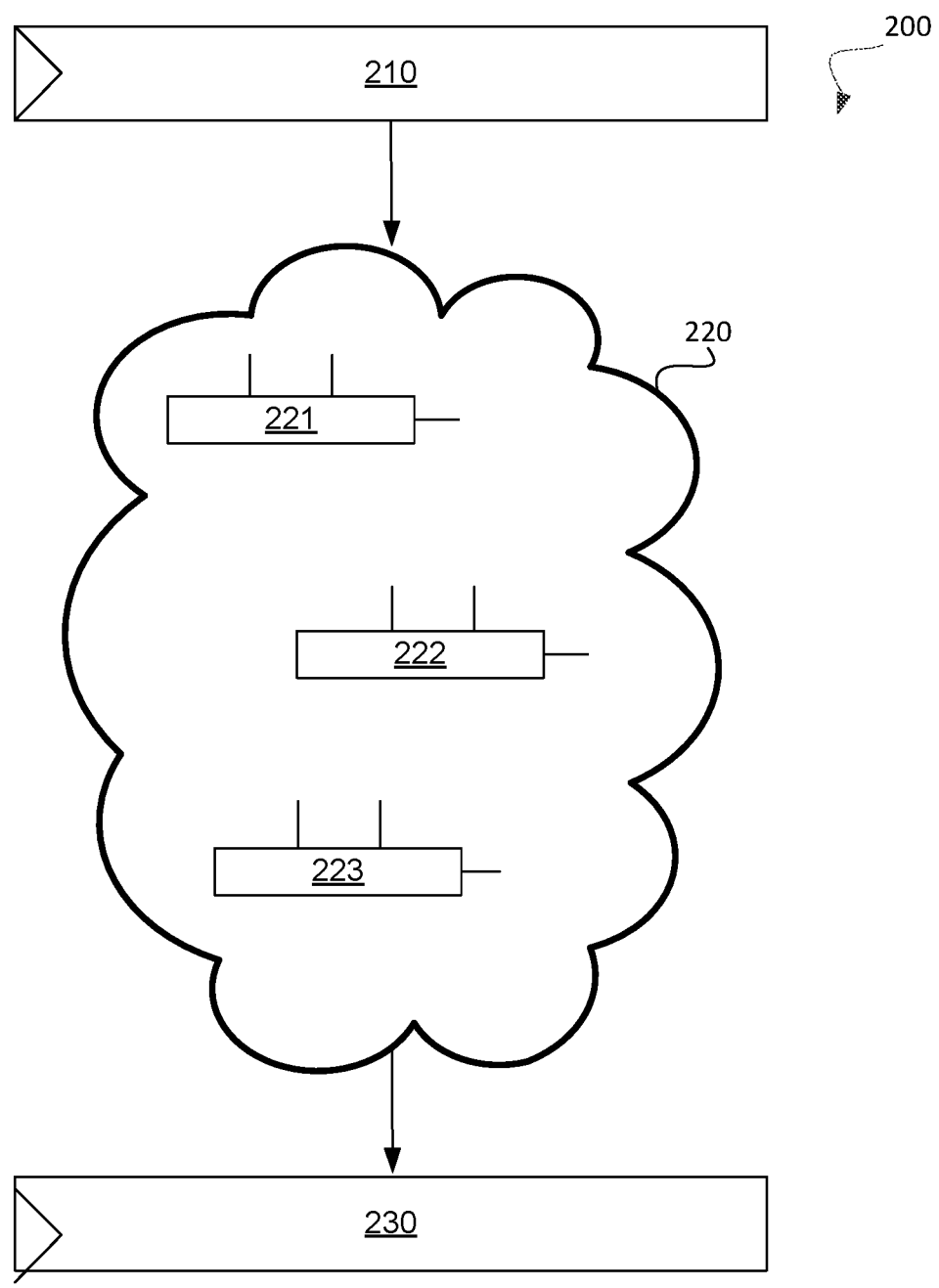
FIG. 2 illustrates an example freeze logic of a device in accordance with some embodiments of the present disclosure.

FIG. 2 illustrates an example freeze logic environment 200 of a device. In general, the freeze logic environment 200 may include freeze logic 220 that corresponds to the freeze logic 110 of the device 100 of FIG. 1.

As shown in FIG. 2, the freeze logic environment 200 may include an input register 210, freeze logic 220, and an output register 230. The freeze logic 220 may receive input signals from the input register 210 and may provide output signals to the output register 230. Furthermore, the freeze logic 220 may be conceptualized or represented by a series of synchronizing blocks, or a group of logical gates or other such circuitry that represent functionality associated with signal synchronization. For example, the freeze logic 220 may include a first synchronizing block 221, a second synchronizing block 222, and a third synchronizing block 223. Each synchronizing block 221, 222, and 223 may receive two or more input signals and may provide one or more output signals based on the received two or more input signals when each of the input signals have been received by the synchronizing block. Further details with regard to the operation and implementation of the synchronizing block are described in conjunction with FIGS. 3-8.

Figure 3:
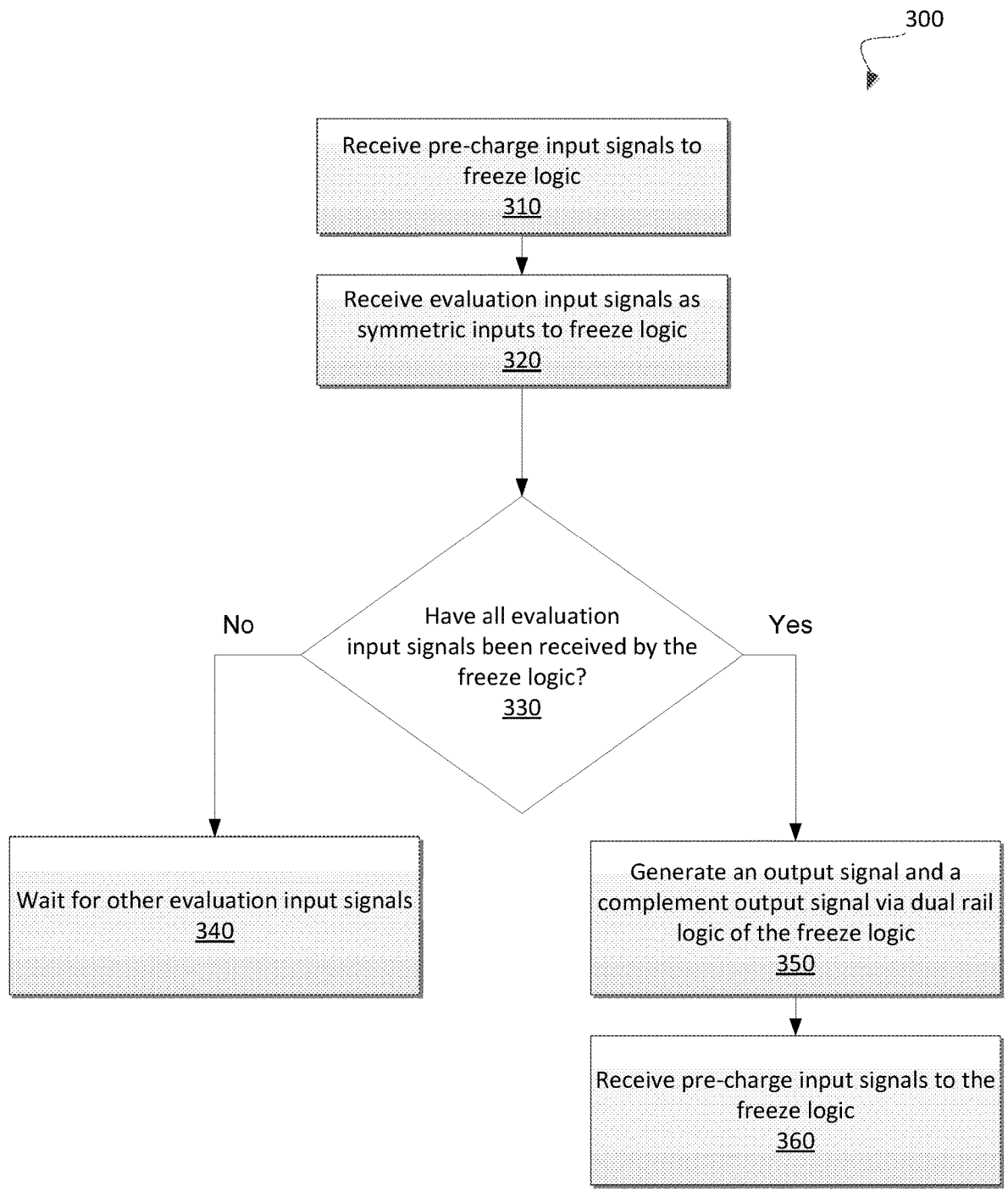
FIG. 3 is a flow diagram of an example method to generate output signals with dual rails of freeze logic in accordance with some embodiments of the present disclosure.

FIG. 3 is a flow diagram of an example method 300 to generate output signals with dual rails of freeze logic. In general, the method 300 may be performed by processing logic that may comprise hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 may be performed by the freeze logic 110 or 220 of FIG. 1 or 2.

As shown in FIG. 3, the method 300 may begin with the processing logic receiving pre-charge input signals to the freeze logic (block 310). For example, input signals may be received where a combination of the input signals results in a pre-charge state of the freeze logic (e.g., either a zero or one output. In some embodiments, the pre-charge input signals may correspond to input signals received during a pre-charge phase that results in an output of either zero or one for each synchronizing block in the freeze logic. In the same or alternative embodiments, the pre-charge phase may correspond to the input signals being set to a logical zero or one and/or any combination of input signals that results in the output signals of a first freeze logic portion and a second freeze logic portion with inputs that are complementary to the first freeze logic portion being a logical zero or a logical one. For example, the outputs of each of the freeze logic portions may be a logical zero or a logical one in response to receiving the input signals of a pre-charge phase. The processing logic may subsequently receive evaluation input signals as symmetric inputs to the freeze logic (block 320). As described in further detail below, symmetric inputs may correspond to a same load for each signal at each of the synchronization blocks. The evaluation input signals may correspond to signals associated with a cryptographic operation (e.g., input data for encryption using a cryptographic key). In some embodiments, the pre-charge input signals may be received at a first clock cycle and the evaluation input signals may be received at a subsequent second clock cycle. In another embodiment, the pre-charge input signals may be received at rising edge of a clock signal and the evaluation input signals may be received at the falling edge of the clock signal. Thus, the negative edge of the clock signal may be used to perform the evaluation phase. In the same or alternative embodiments, a self-timed pre-charge may be used where the pre-charge phase may start at the rising edge of the clock signal and the receiving of the evaluation input signals for the evaluation phase may be after a delay caused by buffers.

Referring to FIG. 3, the processing logic may further determine whether all evaluation input signals have been received by the freeze logic (block 330). For example, a determination may be made as to whether each of the evaluation input signals of a synchronizing block has been received. If all of the evaluation input signals have not yet been received, then the processing logic may wait for other evaluation input signals (block 340). For example, the synchronizing block may not provide an output signal based on the current evaluation input signals if each of the evaluation input signals has not yet been received. If the processing logic determines that each of the evaluation input signals of a synchronizing block has been received, then the processing logic may generate an output signal and a complementary output signal via dual rail logic of the freeze logic (block 350). For example, a first freeze logic portion of the freeze logic may provide a first output (e.g., a logical value of '1') and a second freeze logic portion of the same freeze logic may provide a complementary second output (e.g., a logical value of '0'). Thus, in response to receiving each of the evaluation input signals, the synchronizing blocks of a freeze logic may provide a first and second output signal at complementary values. Subsequently, the processing logic may receive pre-charge input signals to the freeze logic (block 360). For example, another pre-charge phase may be performed after the receiving of the evaluation input signals.

Figure 4:
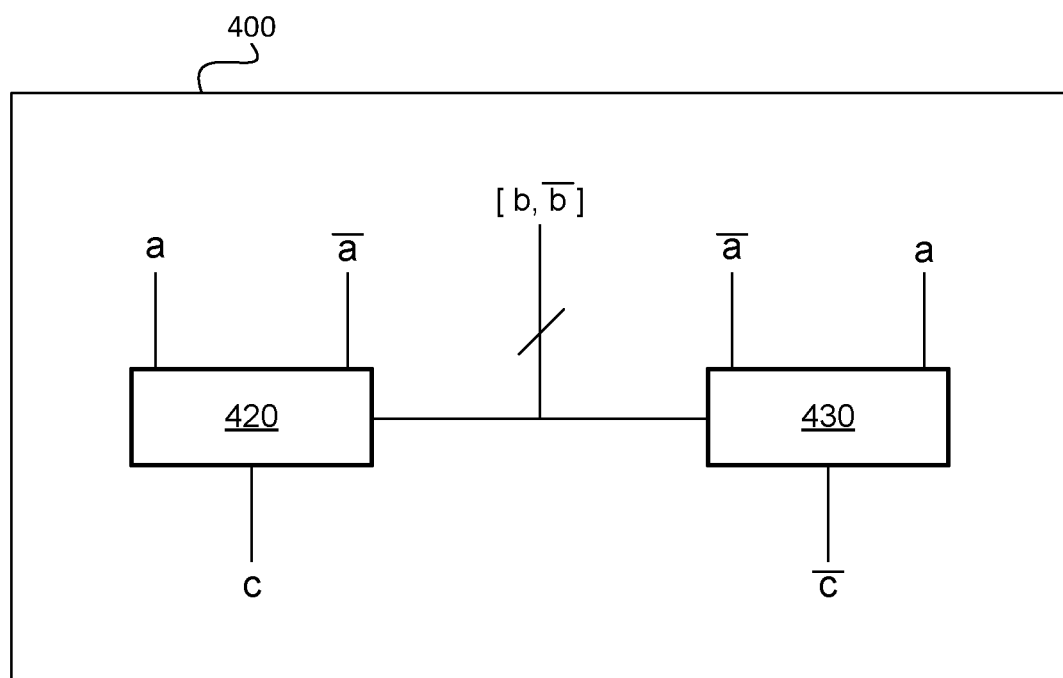
FIG. 4 illustrates an example implementation of freeze logic in accordance with some embodiments.

FIG. 4 illustrates an example implementation of freeze logic 400. In general, the implementation of the freeze logic 400 may be represented by synchronizing blocks. The freeze logic 400 may correspond to the freeze logic 110 or 220 of FIG. 1 or 2.

As shown in FIG. 4, the freeze logic 400 may include a first synchronizing block 420 and a second synchronizing block 430 that is a complement of the first synchronizing block 420. For example, the first synchronizing block 420 may be a first portion of the freeze logic 400 and the second synchronizing block 430 may be a second portion of the freeze logic 400 that is complementary to the first synchronizing block 420. The input signals for each of the synchronizing blocks 420 and 430 may be symmetrical. For example, the signal a and the complementary signal a may be received by each of the synchronizing blocks 420 and 430. Thus, each input signal to the freeze logic may have a symmetric load (e.g., each input signal is received by the same components, logical gates, or synchronizing blocks). For example, each input signal may correspond to the same number of loads (e.g., are received by the same number of loads or components). Furthermore, the synchronizing blocks 420 and 430 may receive a two bit enable signal that is based on a combination of the signal a and the complementary signal $\bar{a}$ as well as a signal b and the complementary signal $\bar{b}$. The first synchronizing block 420 may provide an output signal of c and the second synchronizing block 430 may provide a complementary output signal $\bar{c}$. The implementation of the freeze logic 400 may be based on exclusive-or (XOR) gates, negative AND (NAND) gates, look-up tables (LUTs) of field programmable gate arrays (FPGAs) or other such logical gates or components as described in conjunction with FIGS. 5A-7.

As such, the freeze logic 400 logically corresponds to two multiplexers with a two bit input selection signal that is based on the input signal b and its complementary input signal $\bar{b}$ and the input signal a and its complementary signal $\bar{a}$.

Figure 5A:
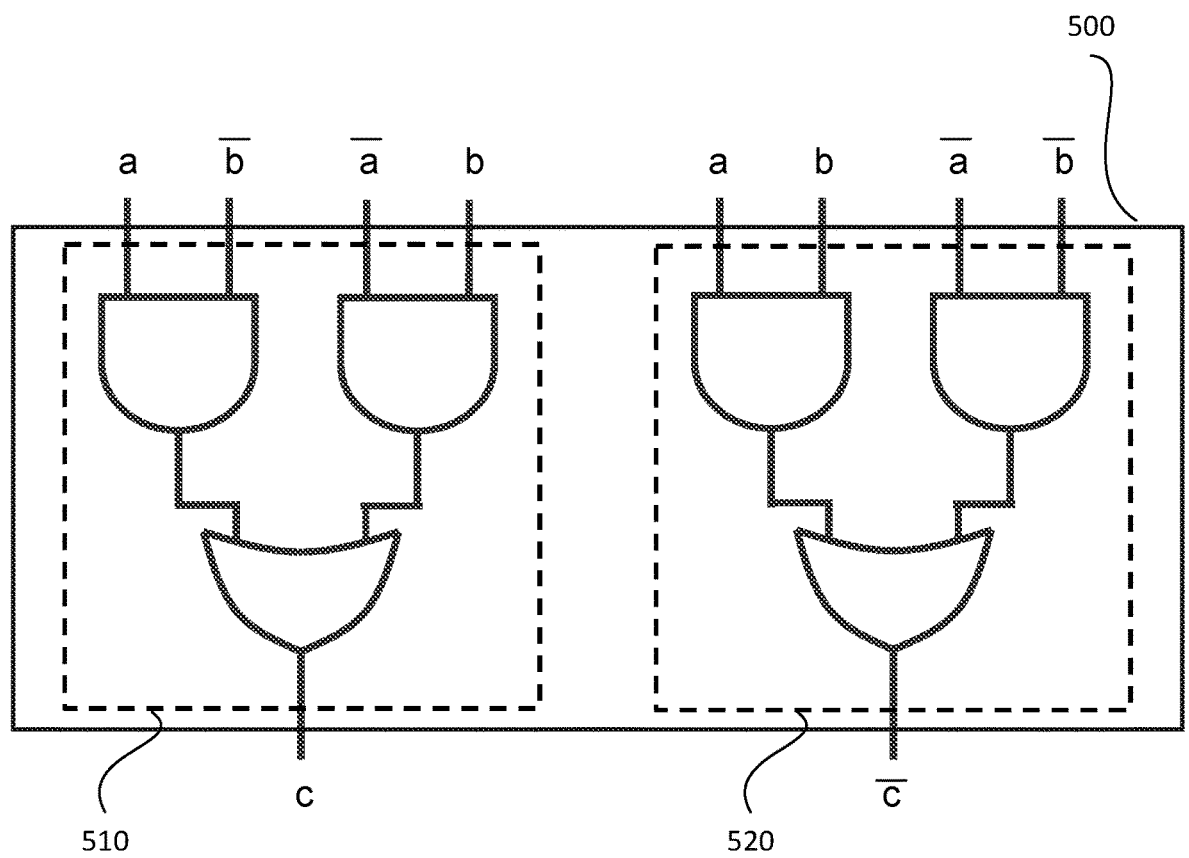
FIG. 5A illustrates an example implementation of freeze logic based on an exclusive-or (XOR) gate functionality in accordance with some embodiments.

FIG. 5A illustrates an example implementation of freeze logic 500 based on an exclusive-or (XOR) gate functionality. In general, the freeze logic 500 may correspond to the freeze logic 110, 220, or 400 of FIG. 1, 2, or 4.

As shown in FIG. 5A, the freeze logic 500 may include a first portion 510 and a second portion 520 that may be a complementary logic of the first portion 510. The first portion 510 may receive an input signal a and its complementary input signal $\bar{a}$ as well as an input signal b and its complementary input signal $\bar{b}$. The first portion 510 of the freeze logic may include AND gates and an OR gate. For example, the inputs may be received by AND gates and the outputs of the AND gates may be inputs to the OR gate. The output of the OR gate may be the output signal c. Similarly, the second portion 520 may be complementary to the first portion 510 so that the output of the OR gate may be the complementary output signal $\bar{c}$. Similar to the first portion 510, the inputs of the second portion 520 may be received by AND gates and the inputs of the OR gate may be the outputs of the AND gates.

The first portion 510 may include a first logical level including two AND gates where the first AND gate receives the input signal a and the complementary input signal $\bar{b}$ and the second AND gate receives the complementary input signal $\bar{a}$ and the input signal b. The output of each of the first and second AND gates are received by an OR gate. The output of the OR gate of the first portion 510 may be the output signal c. Furthermore, the second portion 520 may include a first logical level including two AND gates where the first AND gate receives the input signal a and the input signal b and the second AND gate receives the complementary input signal $\bar{a}$ and the complementary input signal $\bar{b}$. The output of each of the first and second AND gates are received by an OR gate of the second portion 510 that provides the complementary output signal $\bar{c}$.

As shown, the freeze logic may be symmetrically designed so that the first portion 510 and the second portion 520 each include the same components or number and types of logical gates. For example, in the freeze logic 500, each of the first portion 510 and the second portion 520 includes two AND gates and one OR gate. Thus, the first portion 510 and the second portion 520 may have a symmetric configuration of logic gates. Furthermore, the freeze logic 500 may provide pre-charge output signals corresponding to a zero or a value during the pre-charge phase as previously described.

Furthermore, the inputs to the freeze logic may be symmetric. For example, the first portion 510 and the second portion 520 receive the same input signals at different inputs to the first and second portions 510 and 520. For example, the first portion 510 may receive the input signal a and its complementary input signal $\bar{a}$, the input signal b and its complementary input signal $\bar{b}$. The second portion 520 may receive the same input signals but may receive the input signals in a different order (e.g., the AND gates in the first logical level receive the input signals in a different order). The symmetry with regard to the inputs to the freeze logic may provide resistance to a DPA attack by preventing different signal arrival times at various gate inputs. In operation, the freeze logic 500 may generate the output signal c and its complementary signal $\bar{c}$ based on the truth table as shown in FIG. 5B. In some embodiments corresponding to a pre-charge phase providing outputs of a logical zero, the first, second, third, fifth, and ninth rows of the truth table may represent the pre-charge states, the fourth, eight, and eleventh through sixteenth rows may represent invalid states of the freeze logic, and rows six, seven, ten, and eleven may represent valid states of the freeze logic.

Figure 6A:
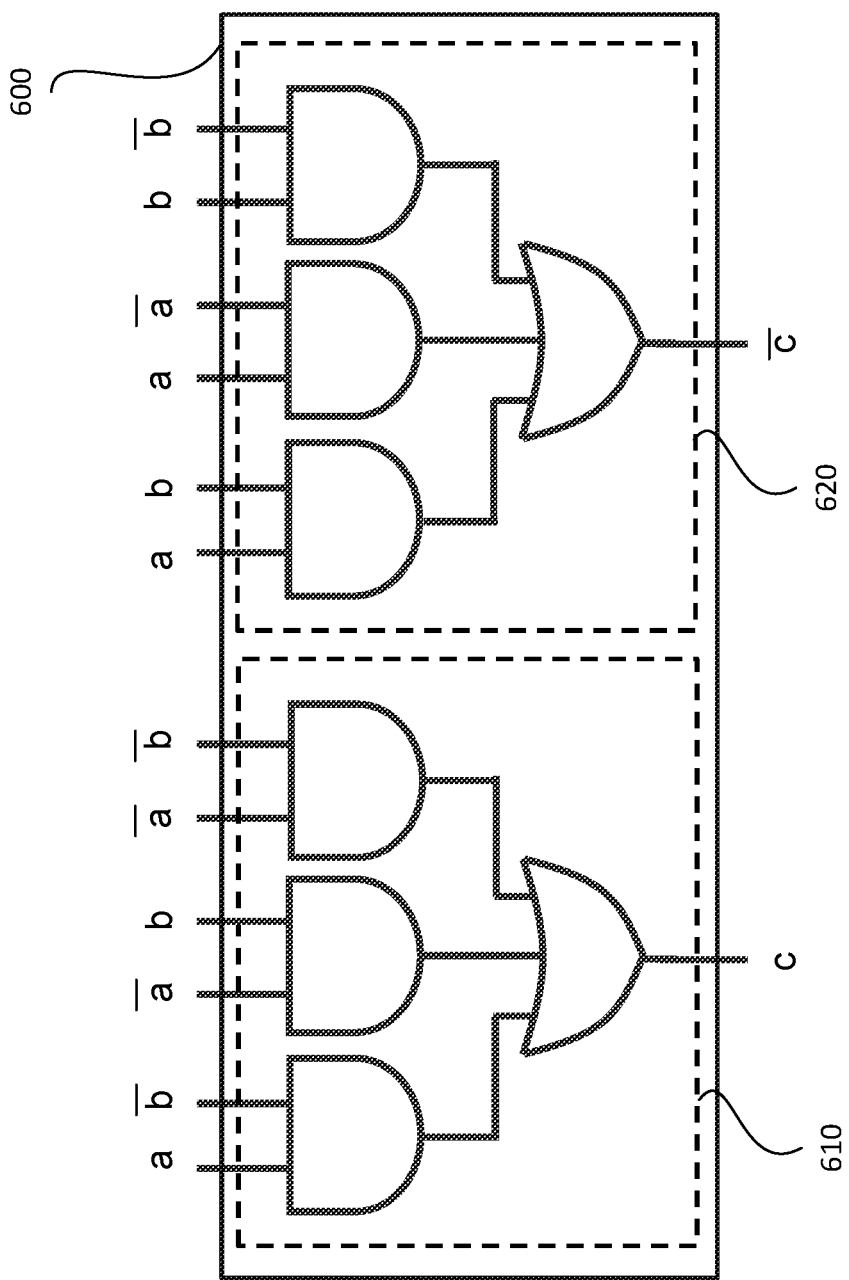
FIG. 6A illustrates another example implementation of freeze logic based on a negative AND (NAND) gate functionality in accordance with some embodiments.

FIG. 6A illustrates another example implementation of freeze logic based on a negative AND (NAND) gate functionality in accordance with some embodiments. In general, the freeze logic 600 may correspond to the freeze logic 110, 220, or 400 of FIG. 1, 2, or 4.

As shown in FIG. 6A, the freeze logic 600 may include a first portion 610 and a second portion 620 that may be a complementary of the first portion 610. The first portion 610 may receive an input signal a and its complementary input signal $\bar{a}$ as well as an input signal b and its complementary input signal $\bar{b}$. The first portion 610 of the freeze logic may further include AND gates and an OR gate. For example, the inputs may be received by three AND gates and the outputs of the three AND gates may be inputs to the OR gate. The output of the OR gate may be the output signal c. Similarly, the second portion 620 may be complementary to the first portion 610 so that the output of the OR gate may be the complementary output signal $\bar{c}$. Similar to the first portion 610, the inputs of the second portion 620 may be received by three AND gates and the inputs of the OR gate may be the outputs of the three AND gates.

The first portion 610 may include a first logical level including three AND gates where the first AND gate receives the input signal a and the complementary input signal $\bar{b}$, the second AND gate receives the complementary input signal $\bar{a}$ and the input signal b, and the third AND gate receives the complementary input signal $\bar{a}$ and the complementary input signal $\bar{b}$. The output of each of the first, second, and third AND gates are received by an OR gate. The output of the OR gate of the first portion 610 may be the output signal c. Furthermore, the second portion 620 may include a first logical level including three AND gates where the first AND gate receives the input signal a and the input signal b, the second AND gate receives the input signal a as well as the complementary input signal $\bar{a}$, and the third AND gate receives the input signal b and the complementary input signal $\bar{b}$. The output of each of the first, second, and third AND gates are received by an OR gate of the second portion 610 that provides the complementary output signal C.

Furthermore, the freeze logic 600 may be symmetrically designed so that the first portion 610 and the second portion 620 each include the same components or number of logical gates. For example, in the freeze logic 600, each of the first portion 610 and the second portion 620 includes three AND gates and one OR gate. Furthermore, the inputs to the freeze logic may be considered to be symmetric as the input signal a or its complementary input signal input signal $\bar{a}$, as well as the input signal b or its complementary input signal $\bar{b}$ are associated with the same number of loads for each of the first portion 610 and the second portion 620. For example, the input signal a and its complementary input signal is received by three AND gates from the first portion 610 and three AND gates from the second portion 620 and the input signal b and its complementary input signal is received by three AND gates from each of the first portion 610 and the second portion 620.

Figure 6B:
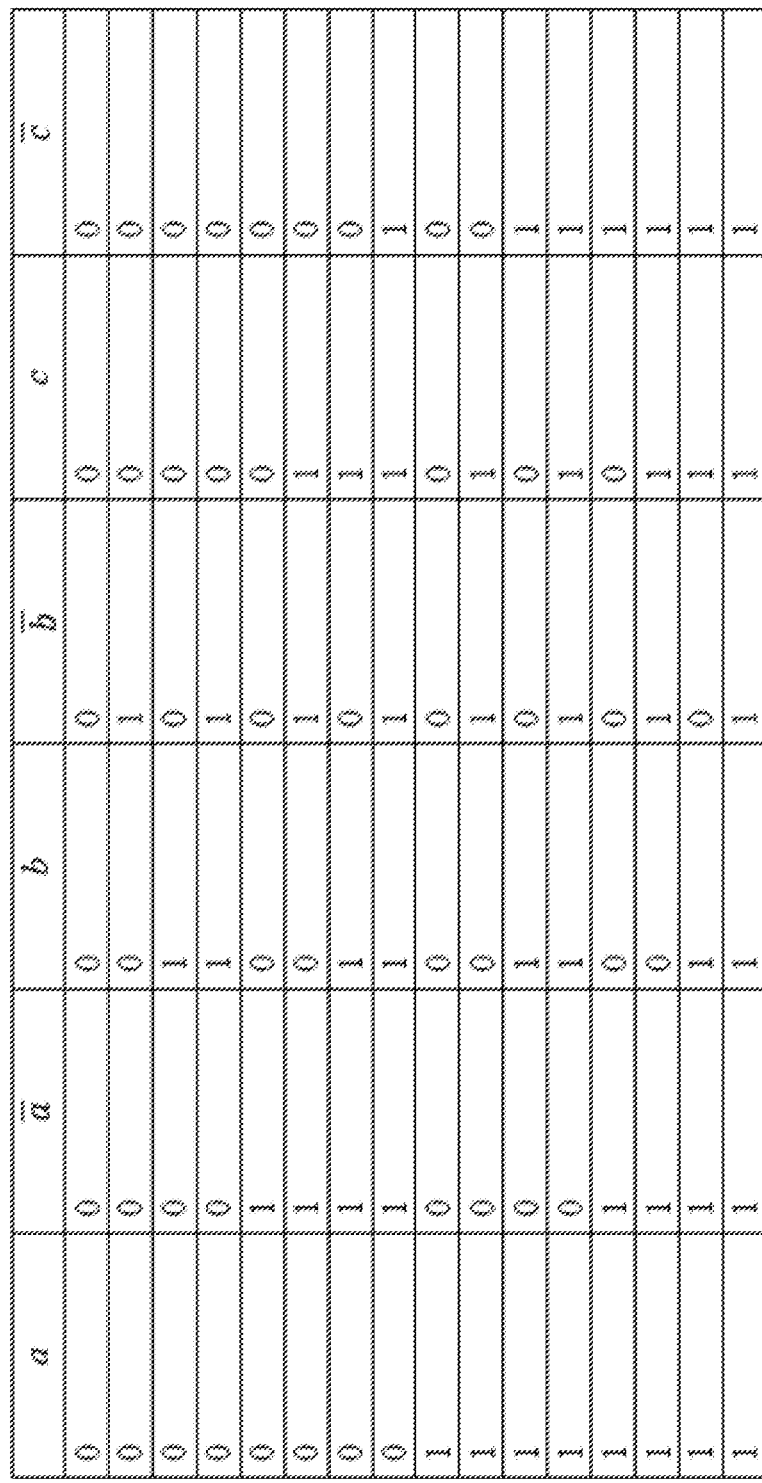
FIG. 6B illustrates a truth table corresponding to the operation of an example implementation of freeze logic based on the NAND gate functionality in accordance with some embodiments.

In operation, the freeze logic 600 may generate the output signal c and the complementary output signal $\bar{c}$ based on the truth table as shown in FIG. 6B. Furthermore, the freeze logic 600 may generate pre-charge output signals (e.g., a one or a zero) during the pre-charge phase as previously described.

Figure 7:
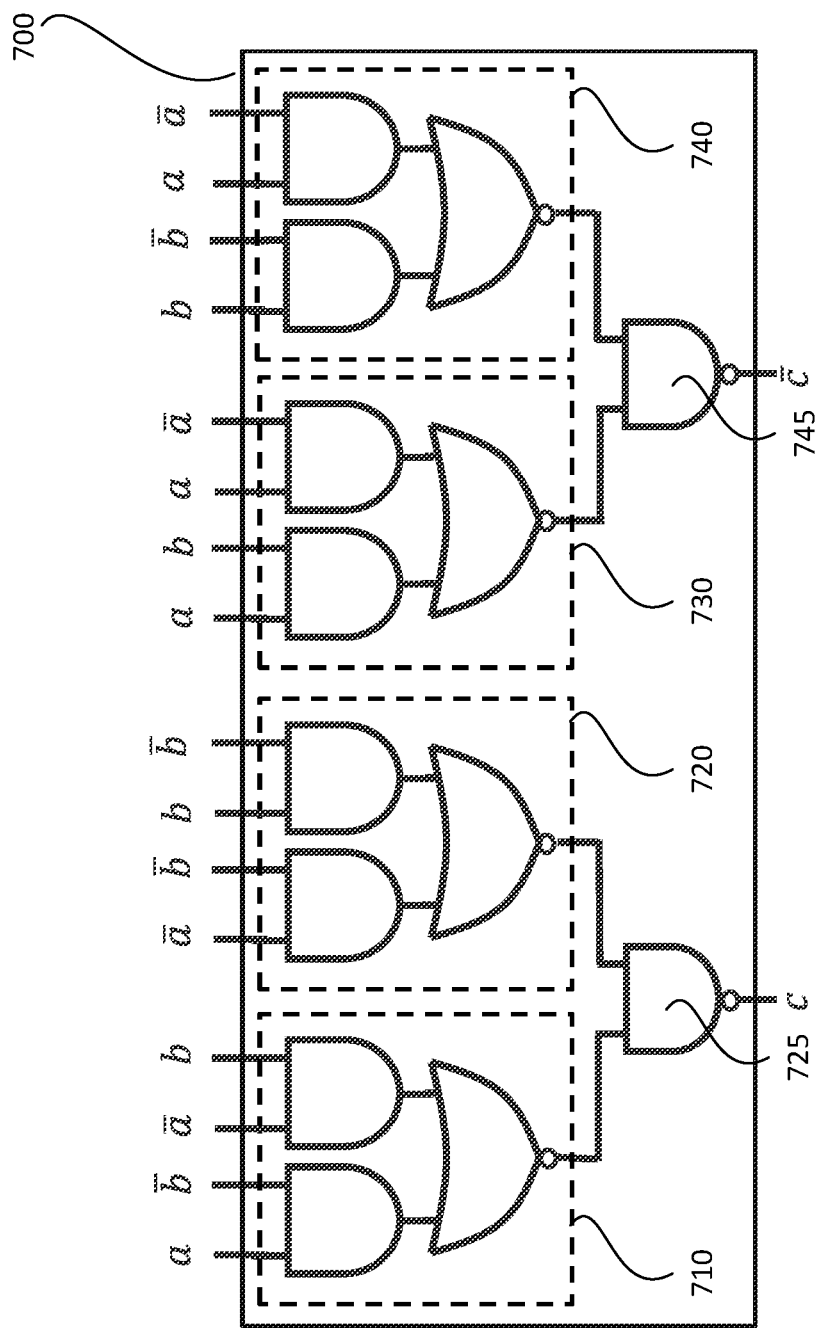
FIG. 7 illustrates another example implementation of freeze logic based on the NAND gate functionality in accordance with some embodiments of the present disclosure.

FIG. 7 illustrates another example implementation of freeze logic 700 based on the NAND gate functionality. In general, the freeze logic 700 may correspond to the freeze logic 110, 220, or 400 of FIG. 1, 2, or 4.

As shown in FIG. 7, the freeze logic 700 may include groups 710, 720, 730, and 740 of two AND gates and a NOR gate where the output of each group is to a NAND gate. For example, the outputs of the groups 710 and 720 are inputs for the NAND gate 725 and the outputs of the groups 730 and 740 are inputs for the NAND gate 745. The freeze logic 700 may further be symmetrically designed and the loads for each input signal may be the same. For example, the input signals a and $\bar{a}$ and b and $\bar{b}$ are each associated with four loads in the freeze logic 700.

In some embodiments, the freeze logic may be implemented using a lookup table (LUT) of a field programmable gate array (FPGA). For example, freeze logic may be based on a slice (e.g., a logical grouping of resources) of an FPGA. The freeze logic may be implemented by a first LUT and a second LUT of a slice of the FPGA. In some embodiments, the first LUT may perform a first operation to generate the output signal c and the second LUT 820 perform a second operation to generate the complementary output signal $\bar{c}$. In some embodiments, each of the first LUT and the second LUT may correspond to a four input LUT. In alternative embodiments, a two output LUT may be used where the logic is split into two five input LUTs and a multiplexer of the slice of the two output LUT is kept static. The first LUT and the second LUT, or other such components used to implement the freeze logic, may be locally grouped so as to reduce or avoid differences in input signal arrival times to the freeze logic.

Figure 8:
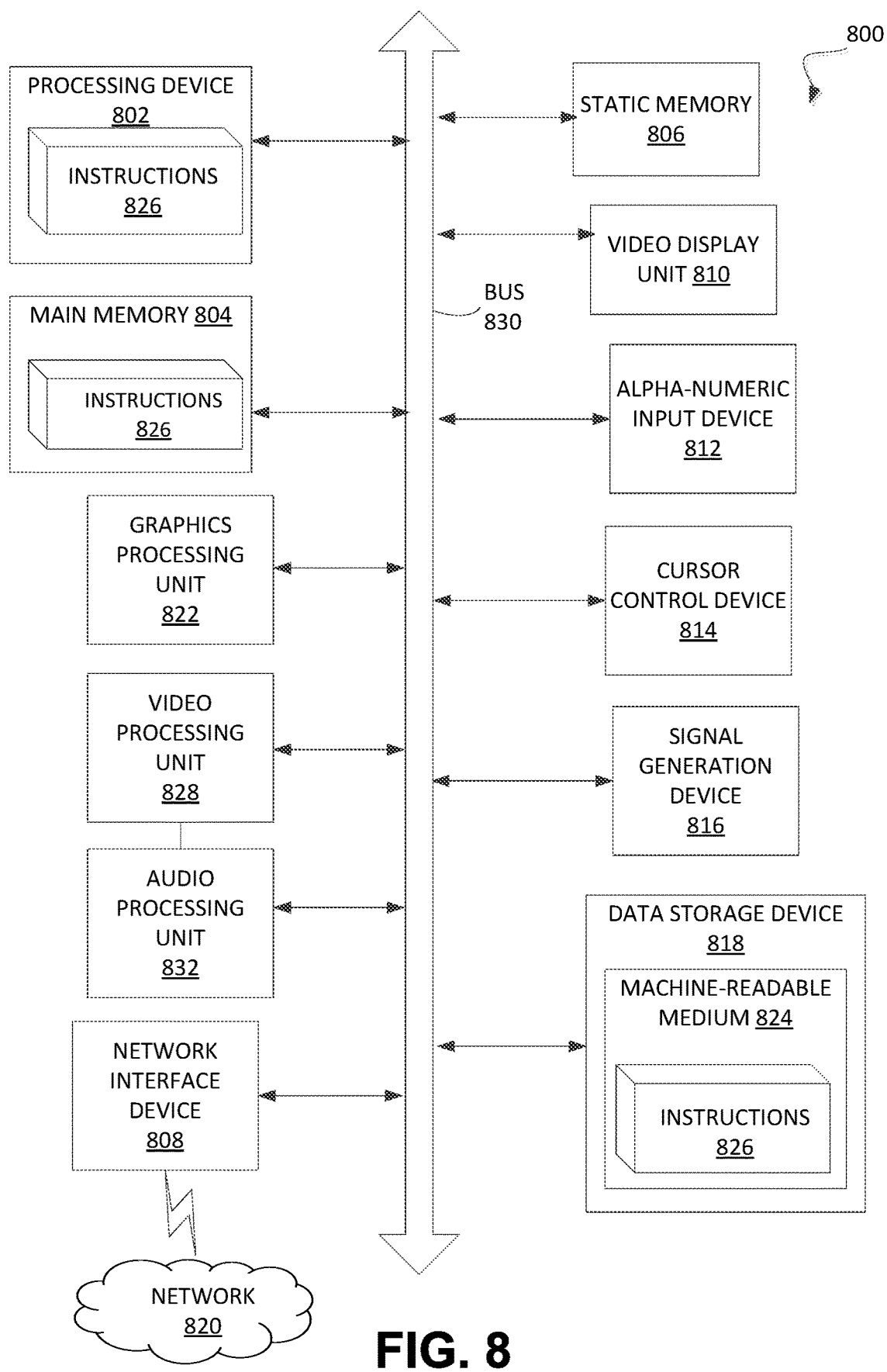
FIG. 8 illustrates a block diagram of an embodiment of a computer system in which some embodiments of the disclosure may operate.

FIG. 8 illustrates an example machine of a computer system 800 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 800 includes a processing device 802, a main memory 804 (e.g., read-only memory (ROM), flash memory, dynamic random access memory (DRAM) such as synchronous DRAM (SDRAM) or Rambus DRAM (RDRAM), etc.), a static memory 806 (e.g., flash memory, static random access memory (SRAM), etc.), and a data storage device 818, which communicate with each other via a bus 830.

Processing device 802 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 802 may also be one or more special-purpose processing devices such as an application specific integrated circuit (ASIC), a field programmable gate array (FPGA), a digital signal processor (DSP), network processor, or the like. The processing device 802 is configured to execute instructions 826 for performing the operations and steps discussed herein.

The computer system 800 may further include a network interface device 808 to communicate over the network 820. The computer system 800 also may include a video display unit 810 (e.g., a liquid crystal display (LCD) or a cathode ray tube (CRT)), an alphanumeric input device 812 (e.g., a keyboard), a cursor control device 814 (e.g., a mouse), a graphics processing unit 822, a signal generation device 816 (e.g., a speaker), video processing unit 828, and audio processing unit 832.

The data storage device 818 may include a machine-readable storage medium 824 (also known as a computer-readable medium) on which is stored one or more sets of instructions or software 826 embodying any one or more of the methodologies or functions described herein. The instructions 826 may also reside, completely or at least partially, within the main memory 804 and/or within the processing device 802 during execution thereof by the computer system 800, the main memory 804 and the processing device 802 also constituting machine-readable storage media.

In one implementation, the instructions 826 include instructions to implement functionality corresponding to freeze logic (e.g., the freeze logic 110, 220, or 400 of FIG. 1, 2, or 4). While the machine-readable storage medium 824 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the method. The structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed is:

1. A method comprising:
receiving a first plurality of input signals at a first plurality of logic gates and a second plurality of logic gates, wherein the first plurality of logic gates and the second plurality of logic gates are associated with a symmetric configuration;
generating, by the first plurality of logic gates, a first output at a first value based on a first portion of the first plurality of input signals that are received by the first plurality of logic gates;
generating, by the second plurality of logic gates, a second output at the first value based on a second portion of the first plurality of input signals;
receiving, after the first plurality of input signals, a second plurality of input signals at the first plurality of logic gates and the second plurality of logic gates;
generating, by the first plurality of logic gates, a subsequent first output at a particular value based on a first portion of the second plurality of input signals that are received by the first plurality of logic gates; and
generating, by the second plurality of logic gates, a subsequent second output based on a second portion of the second plurality of input signals that are received by the second plurality of logic gates, wherein a value of the subsequent second output is complementary to the particular value of the subsequent first output; wherein the first plurality of input signals are received at a first time and correspond to the first output and the second output being a pre-charge value of zero or one, and wherein the second plurality of input signals are received at a second time after the first time and correspond to one of the subsequent first output or the subsequent second output being a value of one and the other of the subsequent first output or the subsequent second output being a value of zero.

2. The method of claim 1, wherein the input signals to the first and second plurality of logic gates correspond to symmetric inputs.

3. The method of claim 2, wherein the symmetric inputs correspond to each input signal being received by a same number of loads associated with the first and second plurality of logic gates.

4. The method of claim 1, wherein the first plurality of logic gates and the second plurality of logic gates are associated with the symmetric configuration so that each of the first plurality of logic gates and the second plurality of logic gates comprise a same number of logic gates and types of logic gates.

5. The method of claim 1, wherein a configuration of the first plurality of logic gates and the second plurality of logic gates corresponds to the generating of the subsequent first output and the subsequent second output when each of the input signals are respectively received by the first and second plurality of logic gates.

6. The method of claim 1, wherein a first level of the first and second plurality of logic gates comprises two input logical gates.

7. A system comprising: a memory; and
a processing device operatively coupled with the memory to:
receive a first plurality of input signals at a first plurality of logic gates and a second plurality of logic gates, wherein the first plurality of logic gates and the second plurality of logic gates are associated with a symmetric configuration;
generate, by the first plurality of logic gates, a first output at a first value based on a first portion of the first plurality of input signals that are received by the first plurality of logic gates;
generate, by the second plurality of logic gates, a second output at the first value based on a second portion of the first plurality of input signals;
receive, after the first plurality of input signals, a second plurality of input signals to the first plurality of logic gates and the second plurality of logic gates;
generate, by the first plurality of logic gates, a subsequent first output at a particular value based on a first portion of the second plurality of input signals that are received by the first plurality of logic gates; and
generate, by the second plurality of logic gates, a subsequent second output based on a second portion of the second plurality of input signals that are received by the second plurality of logic gates, wherein a value of the subsequent second output is complementary to the particular value of the subsequent first output; wherein the first plurality of input signals are received at a first time and correspond to the first output and the second output being a pre-charge value of zero or one, and wherein the second plurality of input signals are received at a second time after the first time and correspond to one of the subsequent first output or the subsequent second output being a value of one and the other of the subsequent first output or the subsequent second output being a value of zero.

8. The system of claim 7, wherein the input signals to the first and second plurality of logic gates correspond to symmetric inputs.

9. The system of claim 8, wherein the symmetric inputs correspond to each input signal being received by a same number of loads associated with the first and second plurality of logic gates.

10. The system of claim 7, wherein the first plurality of logic gates and the second plurality of logic gates are associated with the symmetric configuration so that each of the first plurality of logic gates and the second plurality of logic gates comprise a same number of logic gates and types of logic gates.

11. The system of claim 7, wherein a configuration of the first plurality of logic gates and the second plurality of logic gates corresponds to the generating of the subsequent first output and the subsequent second output when each of the input signals are respectively received by the first and second plurality of logic gates.

12. The system of claim 7, wherein a first level of the first and second plurality of logic gates comprises AND logical gates.

13. A circuit comprising: a first register;
a second register; and
a first and second plurality of logic gates coupled between the first register and the second register to:
receive a first plurality of input signals at the first plurality of logic gates and the second plurality of logic gates, wherein the first plurality of logic gates and the second plurality of logic gates are associated with a symmetric configuration;
generate, by the first plurality of logic gates, a first output at a first value based on a first portion of the first plurality of input signals that are received by the first plurality of logic gates;
generate, by the second plurality of logic gates, a second output at the first value based on a second portion of the first plurality of input signals;
receive, after the first plurality of input signals, a second plurality of input signals at the first plurality of logic gates and the second plurality of logic gates;
generate, by the first plurality of logic gates, a subsequent first output at a particular value based on a first portion of the second plurality of input signals that are received by the first plurality of logic gates; and
generate, by the second plurality of logic gates, a subsequent second output based on a second portion of the second plurality of input signals that are received by the second plurality of logic gates, wherein a value of the subsequent second output is complementary to the particular value of the subsequent first output; wherein the first plurality of input signals are received at a first time and correspond to the first output and the second output being a value of zero, and wherein the second plurality of input signals are received at a second time after the first time and correspond to one of the subsequent first output or the subsequent second output being a value of one and the other of the subsequent first output or the subsequent second output being a value of zero.

14. The circuit of claim 13, wherein the input signals to the first and second plurality of logic gates correspond to symmetric inputs.

15. The circuit of claim 14, wherein the symmetric inputs correspond to each input signal being received by a same number of loads associated with the first and second plurality of logic gates.

16. The circuit of claim 13, wherein the first plurality of logic gates and the second plurality of logic gates are associated with the symmetric configuration so that each of the first plurality of logic gates and the second plurality of logic gates comprise a same number of logic gates and types of logic gates.

17. The circuit of claim 13, wherein the generating of the subsequent first and second outputs is associated with a reduction in susceptibility to a side channel attack corresponding to a Differential Power Analysis (DPA) attack or an electromagnetic (EM) analysis.

* * * * *